(12) United States Patent
Takemoto

(10) Patent No.: US 11,053,673 B2
(45) Date of Patent: Jul. 6, 2021

(54) TOILET BOWL, FLUSH TOILET TANK, PIPE BODY, AND PIPE BODY LAYING METHOD

(71) Applicant: Naofumi Takemoto, Tokyo (JP)

(72) Inventor: Naofumi Takemoto, Tokyo (JP)

(*) Notice: Subject to any disclaimer, the term of this patent is extended or adjusted under 35 U.S.C. 154(b) by 38 days.

(21) Appl. No.: 16/525,613

(22) Filed: Jul. 30, 2019

(65) Prior Publication Data

US 2019/0352891 A1 Nov. 21, 2019

Related U.S. Application Data

(63) Continuation of application No. PCT/JP2018/003052, filed on Jan. 30, 2018.

(30) Foreign Application Priority Data

Jan. 30, 2017 (JP) .............................. JP2017-014909

(51) Int. Cl.
*E03D 1/01* (2006.01)
*A47K 13/24* (2006.01)
(Continued)

(52) U.S. Cl.
CPC ................ *E03D 1/01* (2013.01); *A47K 13/24* (2013.01); *B32B 27/08* (2013.01); *E03D 11/02* (2013.01); *E03D 11/13* (2013.01); *C09D 175/02* (2013.01)

(58) Field of Classification Search
CPC ........... E03D 1/01; E03D 11/02; E03D 11/13; A47K 13/24; B32B 27/08
(Continued)

(56) References Cited

U.S. PATENT DOCUMENTS 4,754,781 A 7/1988 Jan de Putter
7,918,284 B2 * 4/2011 Costa .................... E21B 17/04
166/384

(Continued)

FOREIGN PATENT DOCUMENTS

CN 102199393 A 9/2011
CN 202265884 U 6/2012
(Continued)

OTHER PUBLICATIONS

International Search Report and (ISA/237) Written Opinion of the International Search Authority for International Patent Application No. PCT/JP2018/003052, issued/mailed by the Japan Patent Office dated May 15, 2018.
(Continued)

*Primary Examiner* — Huyen D Le
(74) *Attorney, Agent, or Firm* — Staas & Halsey LLP

(57) ABSTRACT

In a toilet bowl composed of a plurality of resin-made components, at least one resin-made component includes a base material made of a foam synthetic resin, and a coating layer made of a polyurea resin covering a surface of the base material. A flush toilet tank includes a base material made of a foam synthetic resin molded in a tank shape, and a coating layer made of a polyurea resin covering a surface of the base material on an inner surface and an outer surface in the tank shape. A pipe body inserted, as a new pipe, into an aging already-existing pipe includes a base material made of a foam synthetic resin formed in a pipe shape, and a coating layer made of a polyurea resin covering a surface of the base material on an inner surface and an outer surface in the pipe shape.

4 Claims, 8 Drawing Sheets

(51) Int. Cl.
*B32B 27/08* (2006.01)
*E03D 11/02* (2006.01)
*E03D 11/13* (2006.01)
*C09D 175/02* (2006.01)

(58) Field of Classification Search
USPC .......................................................... 4/420
See application file for complete search history.

(56) References Cited

U.S. PATENT DOCUMENTS

| | | | |
|---|---|---|---|
| 2012/0260415 A1* | 10/2012 | Chi | E03D 11/02 4/421 |
| 2013/0007953 A1* | 1/2013 | Niu | C08L 33/12 4/300 |
| 2014/0030457 A1 | 1/2014 | Kim | |
| 2015/0183127 A1* | 7/2015 | de la Corte | B28B 7/0002 264/328.8 |
| 2016/0312457 A1* | 10/2016 | Matsunaga | E03D 11/13 |
| 2019/0257065 A1* | 8/2019 | Schibur | E03D 11/13 |
| 2019/0292762 A1* | 9/2019 | He | E03D 9/08 |
| 2019/0389780 A1* | 12/2019 | Mori | C04B 41/5022 |

FOREIGN PATENT DOCUMENTS

| | | |
|---|---|---|
| DE | 3021499 A1 | 12/1980 |
| EP | 0 213 674 A1 | 3/1987 |
| JP | S5956483 U | 4/1984 |
| JP | H0579081 A | 3/1993 |
| JP | H08187766 A | 7/1996 |
| JP | H1037279 A | 2/1998 |
| JP | 2001173085 A | 6/2001 |
| JP | 2003159554 A | 6/2003 |
| JP | 2009-287219 A | 12/2009 |
| JP | 2015200108 A | 11/2015 |
| WO | WO 2011/039298 A1 | 4/2011 |
| WO | 2013119844 A1 | 8/2013 |

OTHER PUBLICATIONS

Chinese Office Action dated Jul. 24, 2020, in corresponding Chinese Patent Application No. 201880008732.1.
Extended European Search Report dated Apr. 30, 2021 in related European Patent Application No. 18743966.6 (13 pages).

* cited by examiner

TOILET BOWL, FLUSH TOILET TANK, PIPE BODY, AND PIPE BODY LAYING METHOD

The contents of the following Japanese patent applications are incorporated herein by reference:
NO. 2017-014909 filed in JP on Jan. 30, 2017, and
NO. PCT/JP2018/003052 filed on Jan. 30, 2018.

BACKGROUND

1. Technical Field

The present invention relates to a toilet bowl, a flush toilet tank, a pipe body, and a pipe body laying method.

2. Related Art

Conventionally, techniques are known in which industrial materials other than ceramics are used as a part of the materials of a toilet bowl and a flush toilet tank (e.g. see Patent Literature 1 and Patent Literature 2). Resins are also used for pipes, such as water service pipes. For example, a technique is known in which two liquids, such as an isocyanate compound and an amine compound, are ejected in jet toward the inner surface of the pipes of already-existing water service pipes for the coating inner surface of the pipes of the water service pipes while these two liquids are mixed (e.g. see Patent Literature 3).

PRIOR ART LITERATURES

Patent Literatures

[Patent Literature 1] Japanese Patent Application Publication No. H10-37279
[Patent Literature 2] Japanese Patent Application Publication No. H5-79081
[Patent Literature 3] Japanese Patent Application Publication No. 2003-159554

The toilet bowl, the flush toilet tank, and the pipes are desirably lightweight and strong.

GENERAL DISCLOSURE

In a first aspect of the present invention, a toilet bowl is to be provided. The toilet bowl may be composed of a plurality of resin-made components. At least one resin-made component may include a base material. The base material may be made of a foam synthetic resin. At least one resin-made component may include a coating layer. The coating layer may be made of a polyurea resin. The coating layer may cover a surface of the base material on a front surface and a back surface of the resin-made component, and a side surface between the front surface and the back surface.

In a second aspect of the present invention, a flush toilet tank is to be provided. The flush toilet tank may include a base material. The base material may be molded in a tank shape. The base material may be made of a foam synthetic resin. The flush toilet tank may include a coating layer. The coating layer may be made of a polyurea resin. The coating layer made of the polyurea resin may cover a surface of the base material on an inner surface and an outer surface in the tank shape and a side surface between the inner surface and the outer surface in the tank shape.

In a third aspect of the present invention, a pipe body is to be provided. The pipe body may be inserted, as a new pipe, into an aging already-existing pipe. The pipe body may include a base material. The base material may be made of a foam synthetic resin. The pipe body may include a coating layer. The coating layer may be made of a polyurea resin. The base material may be formed in a pipe shape. The coating layer may cover a surface of the base material on an inner surface and an outer surface in the pipe shape and a tip end portion between the inner surface and the outer surface in the pipe shape.

In a fourth aspect of the present invention, a pipe body laying method is to be provided. The pipe body laying method may include the step of preparing a plurality of pipe bodies. The pipe body laying method may include the step of inserting, in a shaft dug on at least one of a front and a back of an aging already-existing pipe, the plurality of pipe bodies into the already-existing pipe while the plurality of pipe bodies is joined to each other. The pipe body may include a base material. The base material may be made of a foam synthetic resin. The pipe body may include a coating layer. The coating layer may be made of a polyurea resin. The base material may be formed in a pipe shape. The coating layer may cover a surface of the base material on an inner surface and an outer surface in a pipe shape and a tip end portion between the inner surface and the outer surface in a pipe shape.

Note that the summary of the invention does not entirely enumerate the necessary characteristics of the present invention. The sub-combinations of groups of these characteristics can also be the invention.

DESCRIPTION OF EXEMPLARY EMBODIMENTS

In the following, the present invention will be described through embodiments of the invention. However, the embodiments below do not limit the inventions of claims. All the characteristic combinations described in the embodiments are not always essential to the solution of the invention.

Figure 1:
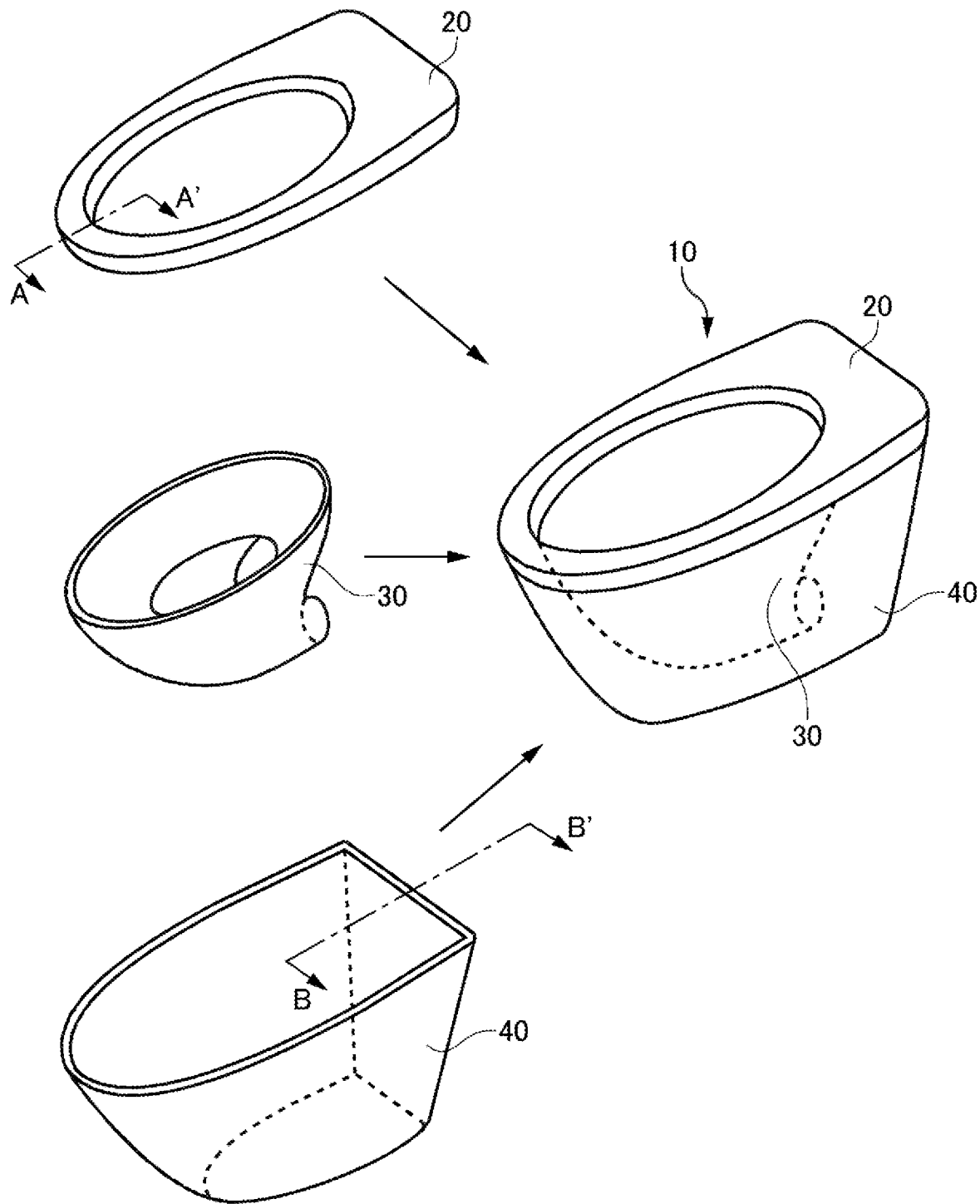
FIG. 1 is a diagram showing an example of a toilet bowl 10 according to a first embodiment of the present invention.

FIG. 1 is a diagram showing an example of a toilet bowl 10 according to a first embodiment of the present invention. The toilet bowl 10 is composed of a plurality of resin-made components. However, the toilet bowl 10 does not necessarily have all the components that are resin-made components. In the present example, the toilet bowl 10 includes a rim part 20, a bowl part 30, and a skirt part 40 as separate components. In these components, the bowl part 30 may be ceramics as conventional ways. The rim part 20 and the skirt part 40 may be resin molded bodies. That is, in the present example, the rim part 20 and the skirt part 40 are a plurality of resin-made components.

The skirt part 40 is formed with an internal space in which the bowl part 30 is accommodated. Thus, the bowl part 30 is accommodated and disposed in the skirt part 40. The bowl part 30 has a drain formed in its inside. The rim part 20 is mounted on the top end edge part of the skirt part 40. The toilet bowl 10 may be thus composed of the rim part 20, the bowl part 30, and the skirt part 40.

Figure 2:
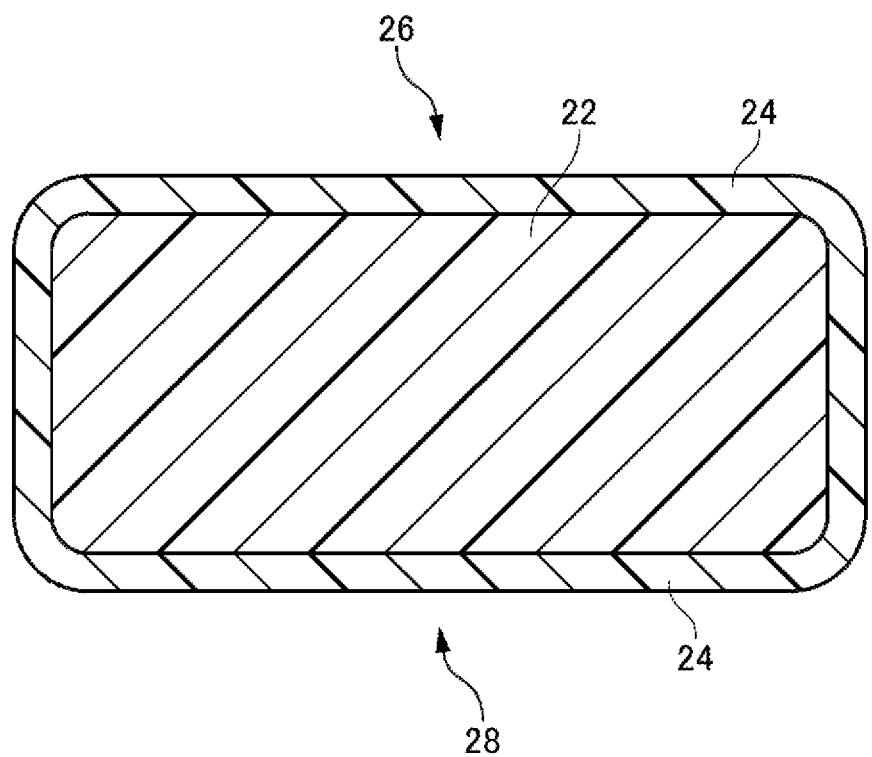
FIG. 2 is a diagram showing a partial cross section of a rim part 20 of the toilet bowl 10.

FIG. 2 is a diagram showing a partial cross section of the rim part 20 of the toilet bowl 10. FIG. 2 shows a cross section of the rim part 20 taken along line A-A' in FIG. 1. The rim part 20 includes a base material 22 and a coating layer 24.

The base material 22 is formed of a foam synthetic resin. In an example, a synthetic resin forming the base material 22 is a polymer compound. As a more specific example, a synthetic resin forming the base material 22 is made of one or more materials selected from polystyrene, polyethylene, polypropylene, and polyurethane. The foam synthetic resin indicates a resin having fine bubbles dispersed in these synthetic resins. In an embodiment, the base material 22 is made of styrofoam (expanded polystyrene).

The coating layer 24 is formed covering the surface of the base material 22. The coating layer 24 is made of a polyurea resin. The polyurea resin is a resin having an urea bond formed by a chemical reaction of isocyanate to an amino group, for example. In an example, the polyurea resin is formed by the reaction of polyisocyanate to polyamine.

The coating layer 24 is preferably formed on the entire surface of the base material 22. In other words, the coating layer 24 entirely covers a seating surface 26, a back surface 28, and the side surface of the rim part 20. The side surface indicates the surface between the seating surface 26 and the back surface 28. The thickness of the coating layer 24 is smaller than the thickness of the base material 22. In an example, the thickness of the base material 22 is 2 cm or more, and the thickness of the coating layer 24 is 5 mm or less.

Figure 3:
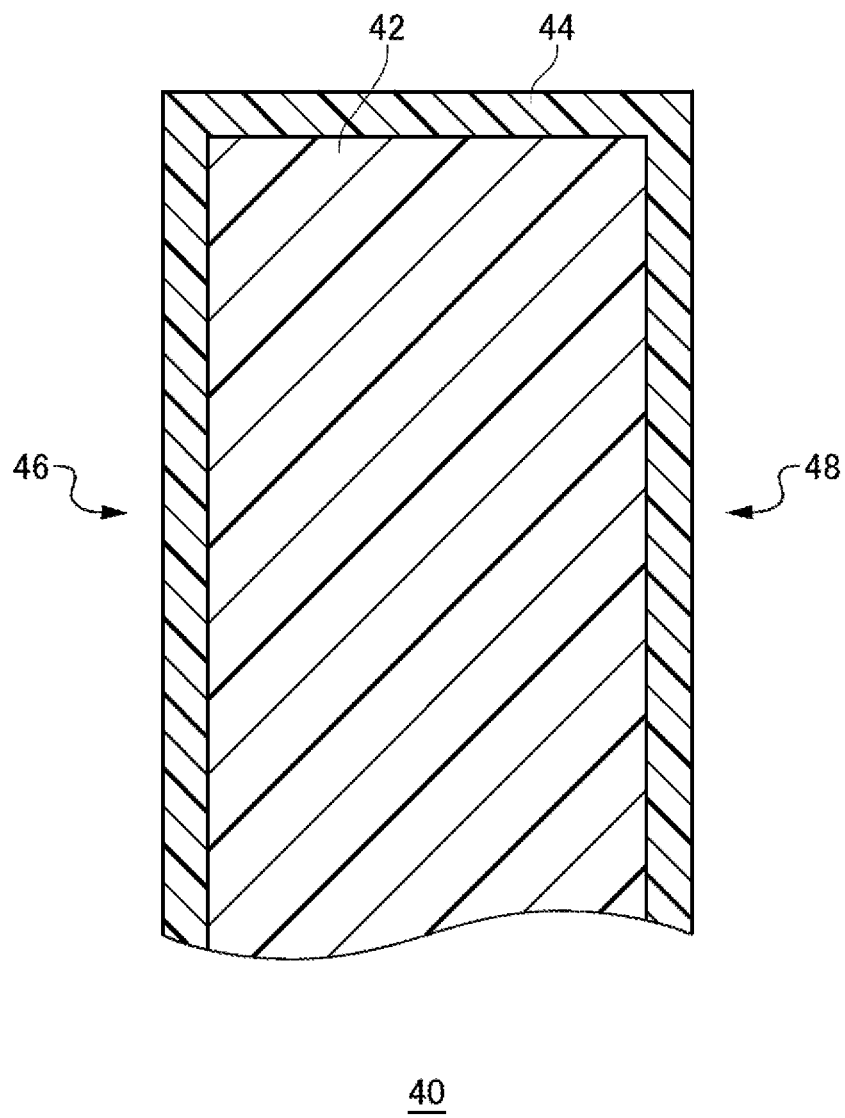
FIG. 3 is a diagram showing a partial cross section of a skirt part 40 of the toilet bowl 10.

FIG. 3 is a diagram showing a partial cross section of the skirt part 40 of the toilet bowl 10. FIG. 3 shows a cross section of the skirt part 40 taken along line B-B' in FIG. 1. The skirt part 40 includes a base material 42 and a coating layer 44. The base material 42 and the coating layer 44 may have configurations similar to the configurations of the base material 22 and the coating layer 24 of the above-described rim part 20.

The coating layer 44 is preferably formed on the entire surface of the base material 42. In other words, the coating layer 44 entirely covers an inner surface 46, an outer surface 48, and the tip end portion of the skirt part 40. The inner surface 46 is the surface of the portion where the bowl part 30 is accommodated and disposed, and the outer surface 48 is the surface on the opposite side of the inner surface 46. The tip end portion is the surface between the inner surface 46 and the outer surface 48. The thickness of the coating layer 44 is smaller than the thickness of the base material 42. In an example, the thickness of the base material 42 is 2 cm or more, and the thickness of the coating layer 44 is 5 mm or less.

Note that in the present example, the case is described in which both of the rim part 20 and the skirt part 40 that are a plurality of resin-made components are covered with a polyurea resin. However, at least one of the plurality of resin-made components may have a coating layer of a polyurea resin. In the present example, a tripartite toilet bowl is shown in which the toilet bowl 10 is composed of the rim part 20, the bowl part 30, and the skirt part 40. However, the toilet bowl 10 only has to be a toilet bowl including a plurality of resin-made components, and is not limited to a tripartite toilet bowl.

According to the present example, at least one of the plurality of resin-made components includes the base material 22 (the base material 42) made of a foam synthetic resin and the coating layer 24 (the coating layer 44) made of a polyurea resin. Therefore, a reduction in manufacturing costs is intended, compared with the case in which components are ceramics. The weight of the toilet bowl 10 is reduced, and transportation or construction is easy. Specifically, with a reduction in manufacturing costs and a reduction in the weight, the toilet bowl 10 can be widely used for temporary toilets or assembly toilets in disaster. In the case in which temporary toilets or assembly toilets are set in disaster or in holding events, it is necessary that a large amount of products be carried and the products be constructed in a short time. According to the toilet bowl 10 of the present example, since the weight of the toilet bowl 10 is reduced, the worker can easily carry the toilet bowl 10. Since the weight is reduced, position adjustment, for example, in construction is also made easy. Therefore, the toilet bowl 10 according to the present example is suited to a temporary toilet or an assembly toilet.

Since the coating layer 24 (the coating layer 44) is made of a polyurea resin, the coating layer 24 has high strength, excellent water resisting properties, and excellent impact resistance properties. Thus, the surface of the base material 22 (the base material 42) is coated with the coating layer 24 (the coating layer 44), and hence the toilet bowl 10 that is ultra-lightweight and excellent in strength, water resisting properties, and impact resistance properties can be provided.

Figure 4:
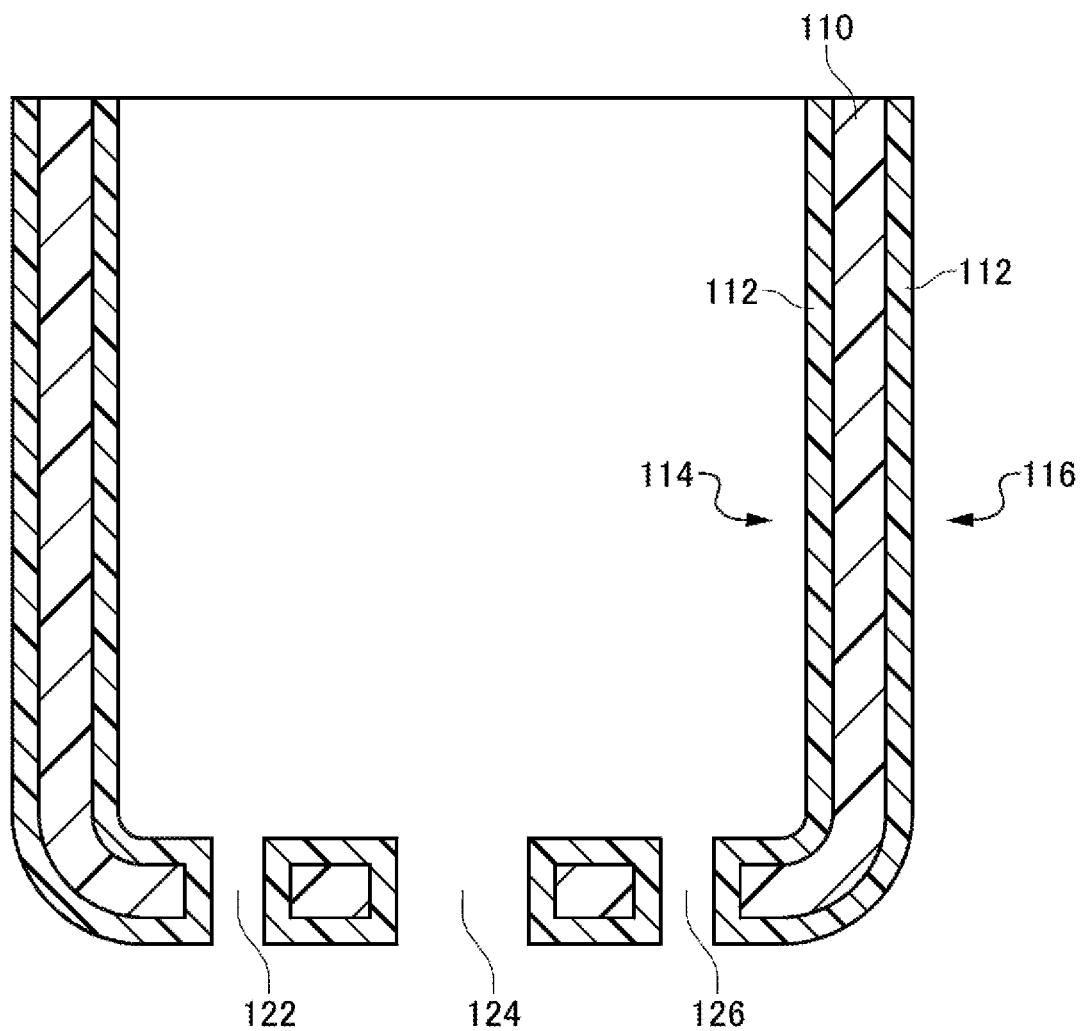
FIG. 4 is a cross sectional view showing an example of a flush toilet tank 100 according to a second embodiment of the present invention.

FIG. 4 is a cross sectional view showing an example of a flush toilet tank 100 according to a second embodiment of the present invention. The flush toilet tank 100 includes a base material 110 and a coating layer 112. The base material 110 is formed in a tank shape. The base material 110 forms an internal space in which water is accommodated. The base material 110 forming the shape of the flush toilet tank 100 may be formed with an opening hole 122, an opening hole 124, and an opening hole 126 on which a bolt and floating valve hardware, for example, are placed.

The base material 110 is made of a foam synthetic resin. The foam synthetic resin may be a polymer compound similar to the base material 22 of the toilet bowl 10 according to the first embodiment. In an embodiment, the base material 110 is made of styrofoam (expanded polystyrene).

The coating layer 112 is formed covering the surface of the base material 110 on an inner surface 114 and an outer surface 116 of the flush toilet tank 100. The coating layer 112 is made of a polyurea resin. The polyurea resin is a resin having an urea bond formed by a chemical reaction of isocyanate to an amino group, for example. In an example, the polyurea resin is formed by the reaction of polyisocyanate to polyamine.

The coating layer 112 is preferably formed on the entire surface of the base material 110. In other words, the coating layer 112 may entirely cover the inner surface 114, the outer surface 116, and the side surface of the flush toilet tank 100. The inner surface 114 of the flush toilet tank 100 means the surface exposed in the internal space of the flush toilet tank 100, and the outer surface 116 means the opposite surface when viewed from the inner surface. The side surface indicates the surface between the inner surface 114 and the outer surface 116. The thickness of the coating layer 112 is smaller than the thickness of the base material 110. In an example, the thickness of the base material 110 is 2 cm or more, and the thickness of the coating layer 112 is 5 mm or less.

The coating layer 112 may also be formed on the surfaces of the opening hole 122, the opening hole 124, and the opening hole 126 communicating between the inner surface 114 and the outer surface 116. As described above, the coating layer 112 is formed on the entire surface of the base material 110, and hence the coating layer 112 can be prevented from being peeled off.

According to the present example, since the coating layer 112 made of a polyurea resin covers the surface of the base material 110 on the inner surface and the outer surface in a tank shape, the surface hardness of the flush toilet tank 100 can be enhanced, and the feed water rate to the inside of the base material 110 can be made zero. Therefore, advantages similar to a ceramics-made tank are exerted from the viewpoints of the surface hardness and the feed water rate unlike the case in which the flush toilet tank 100 is composed only of the base material 110 made of a foam synthetic resin.

The coefficient of thermal conductivity of ceramics is 1.5 W/m/K, whereas the coefficient of thermal conductivity of a foam synthetic resin is 0.03 W/m/K. Therefore, according to the present example, the base material 110 and the coating layer 112 themselves exert the effects of heat insulation and prevention, and hence it is unnecessary to separately provide a convection shielding plate or a waterproof coating layer in the inside of the flush toilet tank 100.

Specifically, since the base material 110 is made of a foam synthetic resin, the base material 110 is highly lightweight. Since the coating layer 112 is made of a polyurea resin, the coating layer 112 has high strength, excellent water resisting properties, and excellent impact resistance properties. Thus, the surface of the base material 110 is coated with the coating layer 112, and hence the flush toilet tank 100 that is ultra-lightweight and excellent in strength, water resisting properties, and impact resistance properties can be provided.

Since the flush toilet tank 100 according to the present example is highly lightweight, the flush toilet tank 100 makes transportation and construction easy. Specifically, in the case in which the flush toilet tank 100 is used for a temporary toilet or an assembly toilet in disaster or in holding events, it is necessary that a large amount of products be carried and the products be constructed in a short time. According to the flush toilet tank 100 of the present example, the weight of the flush toilet tank 100 is reduced, and hence a worker can easily carry the toilet bowl 10. Since the weight is reduced, position adjustment, for example, in construction is also made easy. Therefore, the flush toilet tank 100 according to the present example is suited to a tank for a temporary toilet or an assembly toilet. With a weight reduction in the flush toilet tank 100, restrictions on the placement of the flush toilet tank 100 are reduced. For example, as a consequence that the flush toilet tank 100 can be set in the space above the toilet, the necessity of reserving the space in which the flush toilet tank 100 is placed on the rear side of the toilet seat is reduced. Consequently, the space in front of the toilet seat can be widely reserved.

Figure 5:
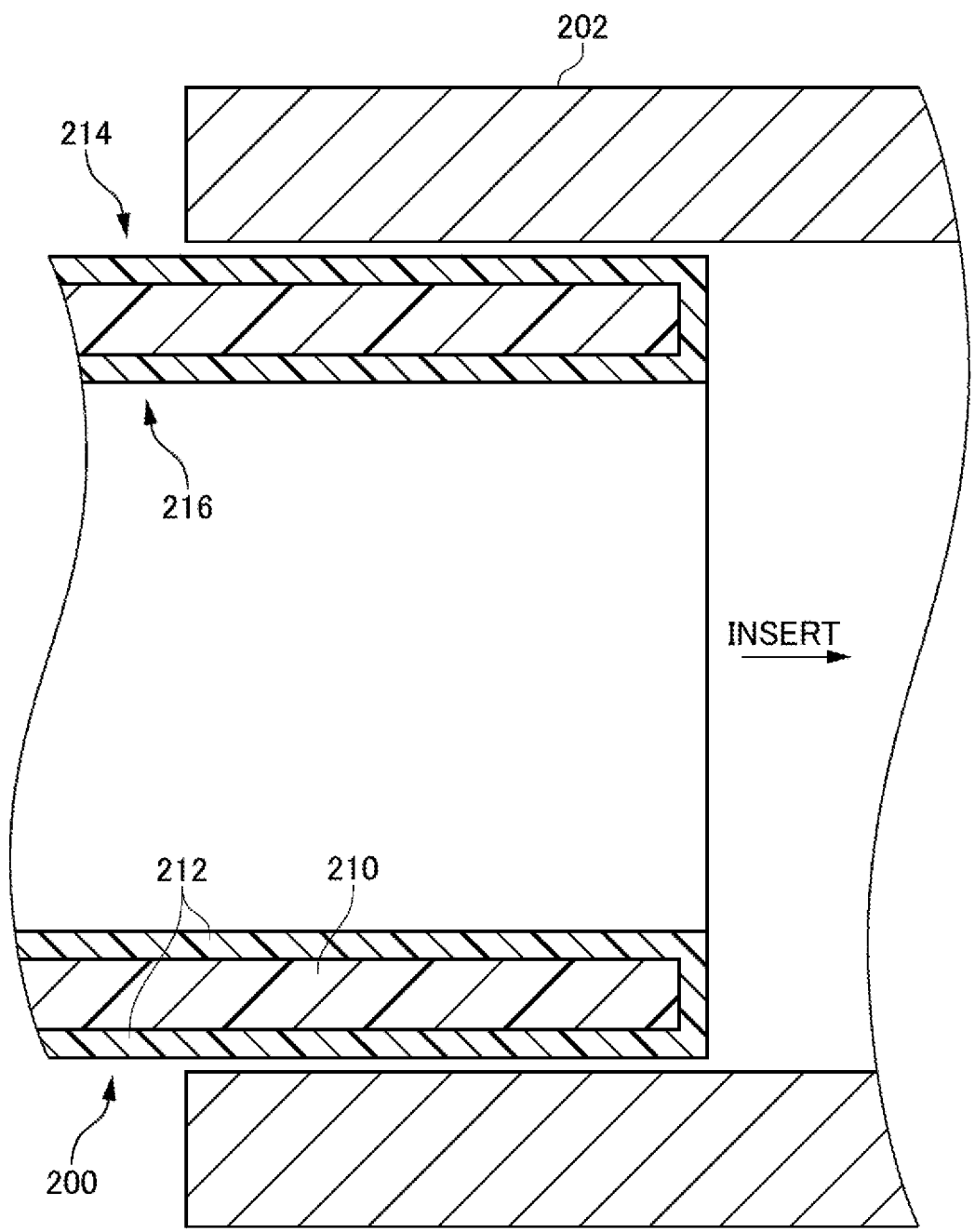
FIG. 5 is a cross sectional view showing an example of a pipe body 200 according to a third embodiment of the present invention.

FIG. 5 is a cross sectional view showing an example of a pipe body 200 according to a third embodiment of the present invention. The pipe body 200 according to the present example is inserted, as a new pipe, into an aging already-existing pipe 202. The already-existing pipe 202 may be an already-existing water service pipe, or may be other pipes. The already-existing pipe 202 functions as a sheath pipe.

The pipe body 200 includes a base material 210 and a coating layer 212. The base material 210 is made of a foam synthetic resin. The foam synthetic resin may be a polymer compound similar to the base material 22 of the toilet bowl 10 according to the first embodiment. In an embodiment, the base material 210 is made of styrofoam (expanded polystyrene). The pipe body 200 is formed in a pipe shape. The outer diameter of the pipe body 200 is smaller than the inner diameter of the already-existing pipe 202.

The coating layer 212 covers the surface of the base material 210 on an outer surface 214 and an inner surface 216 of the base material 210 in a pipe shape. The coating layer 212 is made of a polyurea resin. The polyurea resin is a resin having an urea bond formed by a chemical reaction of isocyanate to an amino group, for example. In an example, the polyurea resin is formed by the reaction of polyisocyanate to polyamine.

The coating layer 212 is preferably formed on the entire surface of the base material 210. The coating layer 212 may entirely cover the outer surface 214, the inner surface 216, and the edge portion of the base material 210 in a pipe shape. The edge portion indicates the portion between the outer surface 214 and the inner surface 216 of the base material 210 in a pipe shape. The thickness of the coating layer 212 is smaller than the wall thickness of the base material 210. In an example, the wall thickness of the base material 210 is 2 cm or more, and the thickness of the coating layer 212 is 5 mm or less.

Figure 6:
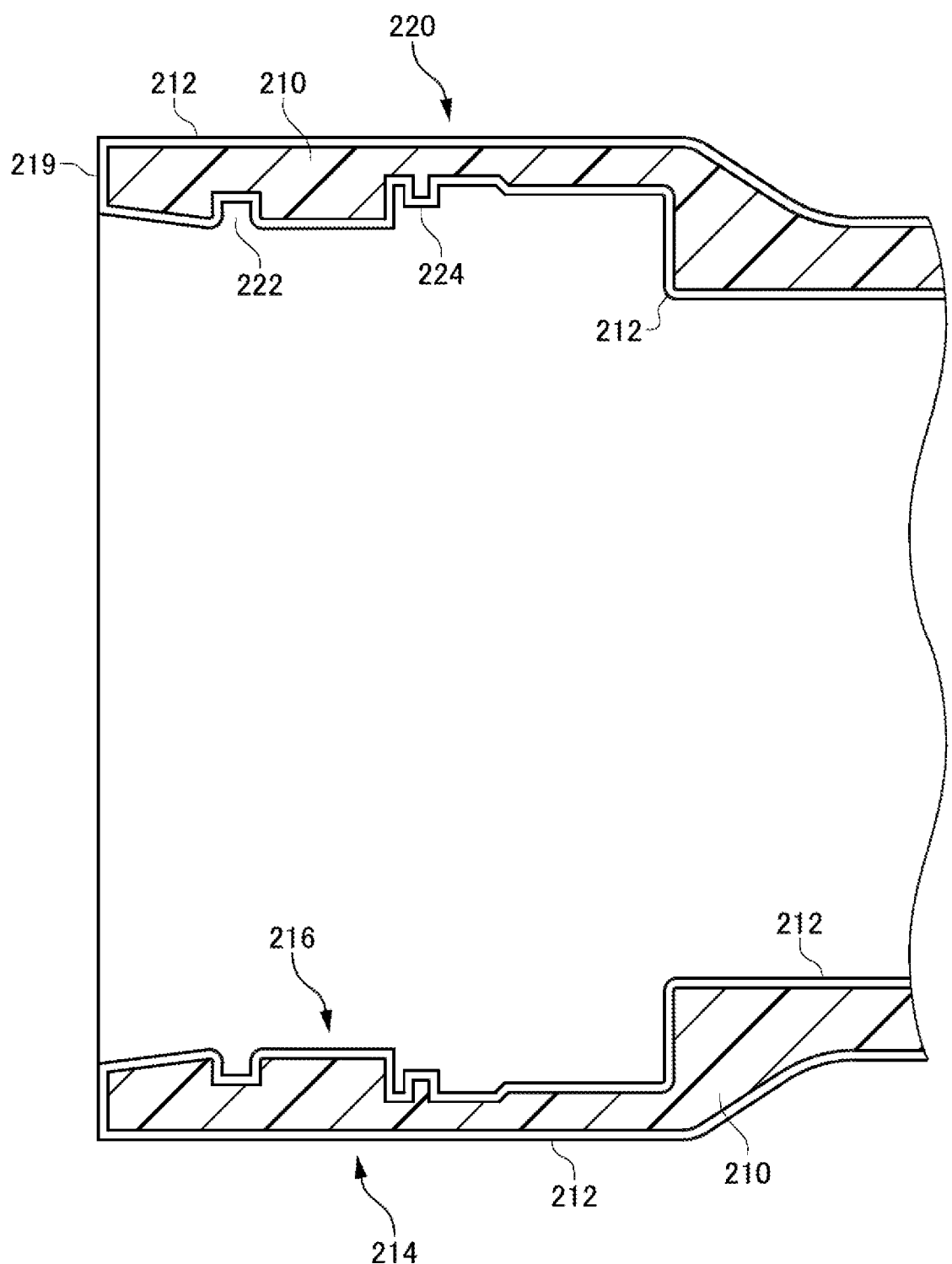
FIG. 6 is a cross sectional view showing an exemplary configuration of a joint part 220 of the pipe body 200.

FIG. 6 is a diagram showing an example of the configuration of the joint part 220 of the pipe body 200. The pipe body 200 according to the present example can be used such that a plurality of pipe bodies 200 is coupled front and back. On the base end portion 219 side of the pipe body 200 according to the present example, the joint part 220 is formed in which the inner diameter is greater than the tip end portion of the pipe body 200. In the joint part 220, a plurality of pipe bodies 200 is joined to each other. The joint part 220 is extendable and bendable. Thus, the plurality of pipe bodies 200 can be inserted into the already-existing pipe 202 while flexibly following the bend of the already-existing pipe 202.

In the joint part 220, a receptacle groove 222 may be formed on the inner surface of the pipe body 200. On the inner surface of the pipe body 200, a projecting part 224 configured to retain a rubber ring may be formed. Both of the receptacle groove 222 and the projecting part 224 may be formed by molding the base material 210. The surfaces of the receptacle groove 222 and the projecting part 224 may also be covered with the coating layer 212. Thus, the strength of the receptacle groove 222 and the projecting part 224 can be enhanced.

Figure 7:
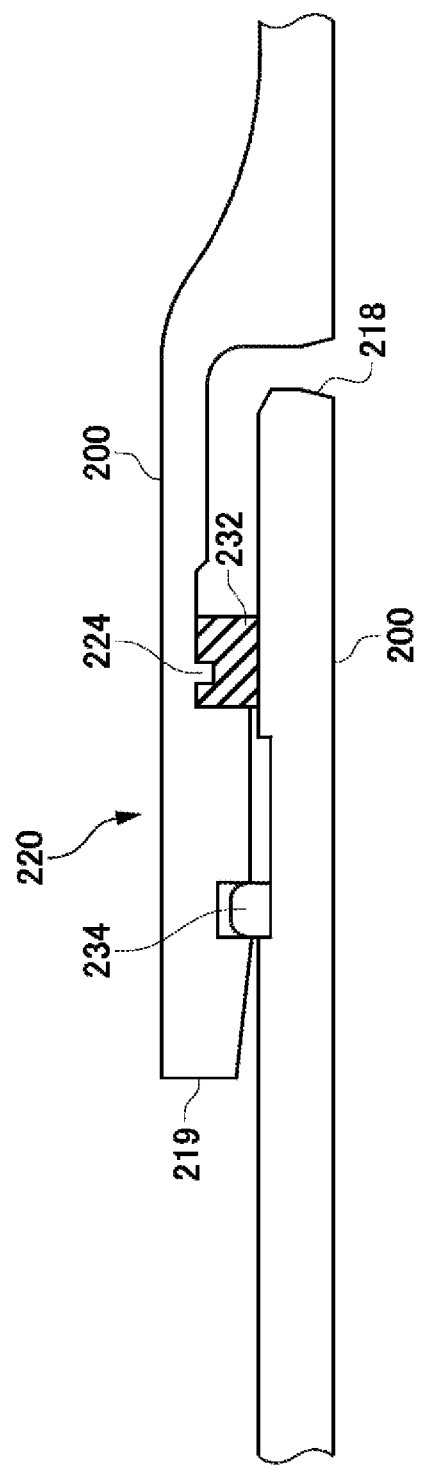
FIG. 7 is a diagram showing a state in which a plurality of pipe bodies 200 is coupled to each other.

FIG. 7 is a diagram showing the state in which the plurality of pipe bodies 200 is coupled to each other. FIG. 7 is a diagram enlarging the main components in FIG. 6. As shown in FIG. 7, on the tip end portion 218 side of the pipe body 200, a tapered lock ring 234 may be provided. The lock ring 234 may be made of a metal, and the surface of the lock ring 234 may also be covered with the coating layer 212. After a tip end portion 218 of the first pipe body 200 is inserted into the joint part 220 provided on the base end portion 219 side of the second pipe body 200, the outer surface 214 of the first pipe body 200 is brought into intimate contact with a rubber ring 232 provided on the base end portion 219 side of the second pipe body 200. The rubber ring may be retained by the projecting part 224.

The lock ring 234 provided on the tip end portion 218 of the first pipe body 200 may be fit into the receptacle groove 222 provided on a base end portion 219 of the second pipe body 200. However, the structure of the joint part 220 of the pipe body 200 is not limited to the case in FIG. 7.

Figure 8:
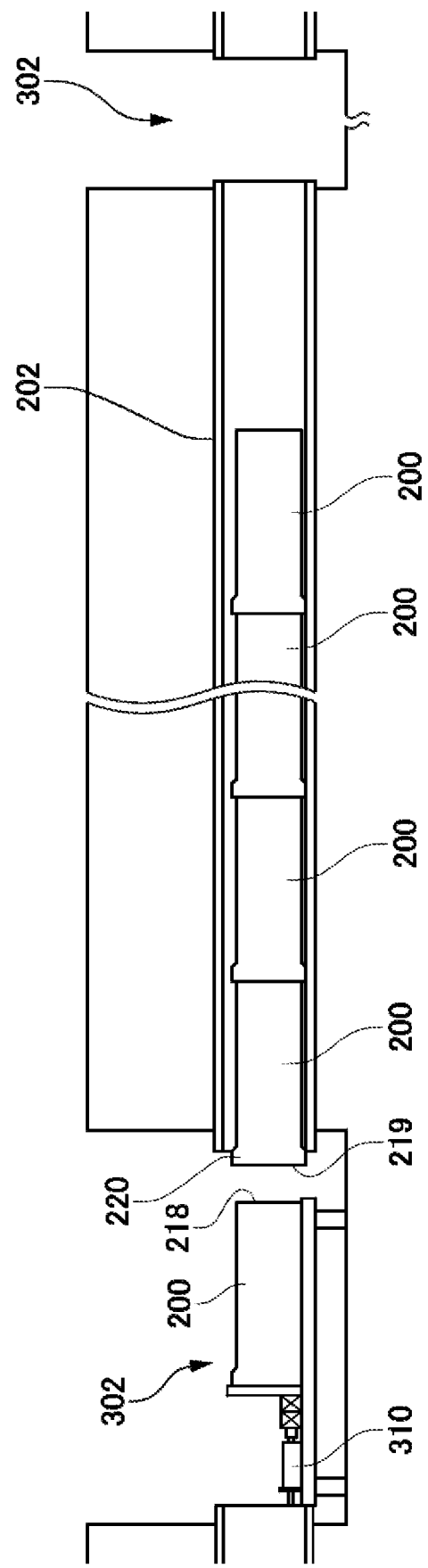
FIG. 8 is a diagram showing the outline of a pipe body laying method according to an aspect of the present invention.

FIG. 8 is a diagram showing the outline of a pipe body laying method according to an aspect of the present invention. The pipe body laying method according to the present example is one kind of a pipe-in-pipe method. In the present example, as new pipes in the pipe-in-pipe method, a plurality of pipe bodies 200 is prepared. Specifically, as shown in FIGS. 5 to 7, the pipe body 200 to be prepared includes the base material 210 made of a foam synthetic resin formed in a pipe shape and the coating layer 212 made of a polyurea resin covering the surface of the base material 210 on the outer surface 214 and the inner surface 216 of the base material 210 in a pipe shape.

Since the base material 210 is made of a foam synthetic resin, the base material 210 is highly lightweight. Since the coating layer 212 is made of a polyurea resin, the coating layer 212 has high strength, excellent water resisting properties, and excellent impact resistance properties. Thus, the surface of the base material 210 is coated with the coating layer 212, and hence the pipe body 200 that is ultra-lightweight and excellent in strength, water resisting properties, and impact resistance properties can be provided. Therefore, the pipe body 200 can be easily carried to a working site.

The pipe body laying method has an inserting step. In the inserting step, the plurality of pipe bodies 200 is inserted into the already-existing pipe 202 in a shaft 302 dug on at least one of the front and the back of the aging already-existing pipe 202 while the plurality of pipe bodies 200 is joined to each other. In the shaft 302, the tip end portion 218 of one pipe body 200 of the plurality of prepared pipe bodies 200 is joined to the base end portion 219 of another pipe body 200. The plurality of pipe bodies 200 may be joined to each other with the joint part 220 as shown in FIGS. 6 and 7. In order to insert the pipe body 200 into the already-existing pipe 202, force may be applied using a hydraulic jack 310.

In the inserting step, a large force is applied to the pipe body 200. However, the surface of the pipe body 200 according to the present example is covered with a polyurea resin, and hence the pipe body 200 can withstand the force applied in the inserting step.

As described above, the present invention is described using the embodiments. However, the technical scope of the present invention is not limited to the foregoing embodiments. The embodiments can be combined with each other. For example, the toilet bowl 10 in the first embodiment can be combined with the flush toilet tank 100 in the second embodiment. The pipe body 200 according to the third embodiment may be used for the drain from the toilet bowl 10. A person skilled in the art obviously knows that the foregoing embodiments can be variously altered or modified. It is obvious from claims that such altered or modified forms can also be included in the technical scope of the present invention.

REFERENCE SIGNS LIST

10 . . . Toilet bowl
20 . . . Rim part
22 . . . Base material
24 . . . Coating layer
26 . . . Seating surface
28 . . . Back surface
30 . . . Bowl part
40 . . . Skirt part
42 . . . Base material
44 . . . Coating layer
46 . . . Inner surface
48 . . . Outer surface
100 . . . Flush toilet tank
110 . . . Base material
112 . . . Coating layer
114 . . . Inner surface
116 . . . Outer surface
122 . . . Opening hole
124 . . . Opening hole
126 . . . Opening hole
200 . . . Pipe body
202 . . . Already-existing pipe
210 . . . Base material
212 . . . Coating layer
214 . . . Outer surface
216 . . . Inner surface
218 . . . Tip end portion
219 . . . Base end portion
220 . . . Joint part
222 . . . Receptacle groove
224 . . . Projecting part
232 . . . Rubber ring
234 . . . Lock ring
302 . . . Shaft
310 . . . Hydraulic jack

What is claimed is:

1. A flush toilet tank comprising:
a base material made of a foam synthetic resin molded in a tank shape; and
a coating layer made of a polyurea resin covering a surface of the base material on an inner surface and an outer surface in the tank shape and a side surface between the inner surface and the outer surface in the tank shape,
wherein the coating layer is also covered on an inner diameter surface of an opening hole on which a bolt and floating valve hardware are placed.

2. A pipe body insertable, as a new pipe, into an already-existing pipe, the pipe body comprising:
a base material made of a foam synthetic resin formed in a pipe shape; and
a coating layer made of a polyurea resin covering a surface of the base material on an inner surface and an outer surface in the pipe shape and an edge portion between the inner surface and the outer surface in the pipe shape,
wherein
the pipe body has a base end portion and an tip end portion,
the base portion has an expanded diameter larger than other portions and has a receptacle groove on the inner surface of the base portion,
the tip end portion is formed to be inserted into a base end portion of other pipe body, the other pipe body having same shape as the pipe body, and
a connection portion, which is fitted into a receptacle groove of the other pipe body, is formed on an outer surface of the tip end portion.

3. A pipe body according to claim 2,
wherein the connecting portion includes a lock ring, and
a surface of the lock ring is covered with the coating layer.

4. A pipe body laying method comprising:
preparing a plurality of pipe bodies having a base material made of a foam synthetic resin formed in a pipe shape, and a coating layer made of a polyurea resin covering a surface of the base material on an inner surface and an outer surface in the pipe shape and an edge portion between the inner surface and the outer surface in the pipe shape,
wherein
  the pipe body has a base end portion and an tip end portion, the base portion has an expanded diameter larger than other portions and has a receptacle groove on the inner surface of the base portion,
  the tip end portion is formed to be inserted into a base end portion of other pipe body,
  the other pipe body having same shape as the pipe body, and
  a connection portion, which is fitted into a receptacle groove of the other pipe body, is formed on an outer surface of the tip end portion;
inserting, in a shaft dug on at least one of a front and a back of an already-existing pipe, the plurality of pipe bodies into the already-existing pipe while the plurality of pipe bodies is joined to each other; and
fitting a tip end portion of the other pipe body into the base end portion.

* * * * *